US012790863B2

(12) United States Patent
Miskel et al.

(10) Patent No.: US 12,790,863 B2
(45) Date of Patent: Nov. 10, 2026

(54) DOOR LOCK

(71) Applicant: Mountain View Promotions Inc., Marietta, GA (US)

(72) Inventors: Hugh M. Miskel, Marietta, GA (US); Taajwar D'Van Howard, Charlotte, NC (US); Kurt Russell Rampton, Charlotte, NC (US); Dillan Scott Shaffer, Charlotte, NC (US)

(73) Assignee: Mountain View Promotions Inc., Marietta, GA (US)

( * ) Notice: Subject to any disclaimer, the term of this patent is extended or adjusted under 35 U.S.C. 154(b) by 0 days.

(21) Appl. No.: 18/891,755

(22) Filed: Sep. 20, 2024

(65) Prior Publication Data

US 2026/0085559 A1 Mar. 26, 2026

(51) Int. Cl.
*E05C 19/18* (2006.01)

(52) U.S. Cl.
CPC .......... *E05C 19/186* (2013.01); *E05C 19/184* (2013.01)

(58) Field of Classification Search
CPC ...... E05C 19/186; E05C 19/184; E05C 19/18; Y10T 292/34; Y10T 292/228; E05B 65/0894; E05B 65/0858; E05B 65/087; E05B 15/0225; E05B 15/635; E05B 2015/0472; E05B 13/00
USPC .............................................................. 70/14
See application file for complete search history.

(56) References Cited

U.S. PATENT DOCUMENTS 390,130 A * 9/1888 Longenecker ........ E05C 19/182 292/292
909,525 A * 1/1909 Benton ................ E05C 19/186 292/259 R
2,236,938 A * 4/1941 Edelen ................... A47B 88/57 292/288
2,495,860 A * 1/1950 Miller ................... E05C 19/186 292/288
2,508,302 A 5/1950 Stue
3,206,793 A * 9/1965 Silverberg ............ E05C 19/003 292/288
3,583,738 A * 6/1971 Uphoff .................... E05C 19/10 292/114
4,067,598 A * 1/1978 Mansour ............... E05C 19/003 292/259 R
4,290,633 A * 9/1981 Sullivan .................. E05C 3/045 292/114
4,372,136 A * 2/1983 Mickelson ............ E05C 19/186 70/91
4,605,251 A * 8/1986 Finlay ..................... E05C 19/18 292/147

(Continued)

FOREIGN PATENT DOCUMENTS

GB 364731 A * 1/1932 ............... E05C 1/04
GB 2182379 A * 5/1987 ......... E05B 65/1066

OTHER PUBLICATIONS

International Search Report & Written Opinion in PCT/US2025/046002, dated Nov. 6, 2025 (11 pages).

*Primary Examiner* — Steven A Tullia

(74) *Attorney, Agent, or Firm* — Barnes & Thornburg LLP

(57) ABSTRACT

A door lock for a door having a door panel and a door knob coupled to the door panel. The door lock is configured to engage with the door knob to block the door panel from moving to an opened position. A method includes installing the door lock on the door knob.

13 Claims, 9 Drawing Sheets

(56) References Cited

U.S. PATENT DOCUMENTS 4,770,450 A * 9/1988 Dacus .................... E05C 19/18 292/258
5,398,982 A * 3/1995 Watson, Jr. ............ E05C 3/048 292/259 R
5,556,143 A * 9/1996 Robinson ............. E05C 19/184 292/259 R
5,664,815 A * 9/1997 Kornder ............... E05C 19/184 292/156
5,704,662 A * 1/1998 Kwiatkowski ........... E06C 1/18 292/259 R
5,709,422 A * 1/1998 Malone .................. E05C 19/18 292/288
5,836,183 A * 11/1998 Derman ............. E05B 73/0082 70/164
6,298,695 B1 * 10/2001 Vezina ............... E05B 73/0082 70/58
6,352,290 B1 * 3/2002 Scottino ............... E05C 19/186 292/259 R
6,560,925 B1 * 5/2003 Rice ..................... E05B 13/002 292/259 R
6,641,185 B2 * 11/2003 Hale .................... E05C 19/184 292/289
7,278,663 B2 10/2007 Witchey
7,377,135 B2 * 5/2008 Copus .................. E05C 19/186 292/259 R
7,537,250 B1 * 5/2009 Gustafson .......... E05B 65/0014 292/259 R
7,637,130 B2 * 12/2009 Carr ....................... E05B 47/00 292/259 R
8,020,414 B2 * 9/2011 Pitisethakarn ........ E05B 67/383 70/56
8,022,573 B2 * 9/2011 Powers ................ E05B 39/005 307/64
8,026,792 B2 9/2011 Powers et al.
D646,556 S 10/2011 Kelleghan
8,061,164 B2 * 11/2011 Johnston ............ E05B 73/0082 70/211
8,069,693 B2 * 12/2011 Powers ............. G07C 9/00174 292/259 R
8,215,140 B1 7/2012 Gaines
8,272,625 B1 * 9/2012 Bassett ................ E05C 19/184 16/230
8,313,128 B2 11/2012 Belyea et al.
8,347,659 B2 * 1/2013 Powers .................. E05B 83/02 292/259 R
8,392,296 B2 * 3/2013 Powers .................. E05B 51/02 705/28
D686,058 S 7/2013 Paik et al.
D698,626 S 2/2014 Ormsbee et al.
8,690,201 B2 * 4/2014 Frazier ..................... E05C 1/04 256/73
8,764,074 B2 * 7/2014 Ploskunak ............... E05C 1/12 292/164
8,783,073 B1 7/2014 Derman
8,851,535 B2 10/2014 Miskel et al.
8,938,997 B2 * 1/2015 Piccoli ............... E05B 73/0029 70/57.1
9,255,602 B2 2/2016 Liang
9,279,278 B2 * 3/2016 Ploskunak ............... E05C 7/04
9,309,703 B2 * 4/2016 Ploskunak ............... E05C 1/12
9,546,506 B1 * 1/2017 Kangatharalingam ..................... E05C 19/184
9,546,507 B2 1/2017 Letson
D794,417 S 8/2017 Hogan et al.
D821,178 S 6/2018 Fontanez et al.
10,094,153 B1 * 10/2018 Ploskunak ........... E05C 19/184
10,094,154 B2 * 10/2018 Ploskunak ........... E05C 19/184
10,174,526 B2 1/2019 Ramachandran et al.
10,221,594 B2 * 3/2019 Raffi .................. E05B 15/0046
10,501,964 B2 12/2019 Kashani
D906,088 S 12/2020 Pizanias et al.
D907,984 S 1/2021 Heroux
11,028,622 B2 * 6/2021 Canaday .............. E05C 19/186
11,105,130 B2 * 8/2021 Seelbinder ............ G08B 21/02
11,466,489 B2 10/2022 Mäihäniemi
11,828,094 B1 11/2023 Kistner
11,866,962 B2 1/2024 Valdes Rudd
2003/0164010 A1 * 9/2003 Galant ............... E05B 73/0082 70/58
2006/0272365 A1 12/2006 Copus
2013/0328330 A1 * 12/2013 McKenzie .......... E05B 65/0014 292/202
2014/0103668 A1 * 4/2014 McKinney ........... E05C 19/188 292/258
2014/0165670 A1 * 6/2014 Strand .................... E05C 19/18 70/101
2015/0233099 A1 8/2015 Holmes
2018/0106071 A1 4/2018 Ivy
2019/0365100 A1 12/2019 Hansen, II et al.

* cited by examiner

DOOR LOCK

BACKGROUND

The present disclosure relates to a security device, and in particular to a security device for a door. More particularly, the present disclosure relates to door lock.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

Generally described, the present disclosure provides in a first exemplary embodiment, a door lock for a double door having a first door panel, a second door panel, a first door knob or handle coupled to the first door panel, and a second door knob or handle coupled to the second door panel. The first and second door knobs are spaced a first distance apart from one another when the door panels are in a closed position and are spaced a second distance apart from one another when the door panels are in an opened position. The second distance is greater than the first distance. The door lock includes a first knob anchor, a second knob anchor, and a lock hub. The first knob anchor is configured to engage the first door knob when the first door panel is in the closed position. The second knob anchor is configured to engage the second door knob when the second door panel is in the closed position. The lock hub is configured to engage with the first knob anchor and the second knob anchor when the first and second door panels are in the closed position to block separation of the first and second knob anchors so that the first and second door panels are retained in the closed position.

In illustrative embodiments, the lock hub is formed to include a plurality of slots spaced horizontally from one another between a first end of the lock hub and an opposite second end of the lock hub. A respective portion of the first and second door knob anchors is configured to be inserted in a respective one of the slots in a vertical direction to attach the first and second knob anchors to the lock hub.

In a second aspect of the present disclosure, as door lock kit includes the door lock and a door catch configured to mount to a wall or a doorframe bordering a doorway. The door catch is mounted in a fixed position relative to a single door. The door lock is configured to engage with a door knob and the door catch when the single door is in a closed position to block the single door from opening.

In a third aspect of the present disclosure, a method of securing a door way includes positioning a first door and a second door in a closed position in which a first door knob of the first door and a second door knob of the second door are arranged adjacent to one another and the first and second doors close the doorway. The method further includes installing a door lock onto the first door knob and the second door knob to block the first door and the second door from moving away from one another, the door lock including a first knob anchor, a second knob anchor, and a lock hub formed to include a plurality of slots configured to receive a portion of the first and second knob anchors.

In illustrative embodiments, the method further includes inserting an attachment post included in each knob anchor into a respective slot included in the plurality of slots formed in the lock hub. The method may further include adjusting a lateral distance between the attachment post of the first knob anchor and the second knob anchor relative to the lock hub.

Other features will become apparent upon reading the following detailed description of certain exemplary embodiments, when taken in conjunction with the appended claims.

BRIEF DESCRIPTION OF THE DRAWINGS

The drawings disclose exemplary embodiments in which like reference characters designate the same or similar parts throughout the figures of which.

DETAILED DESCRIPTION

Figure 1:
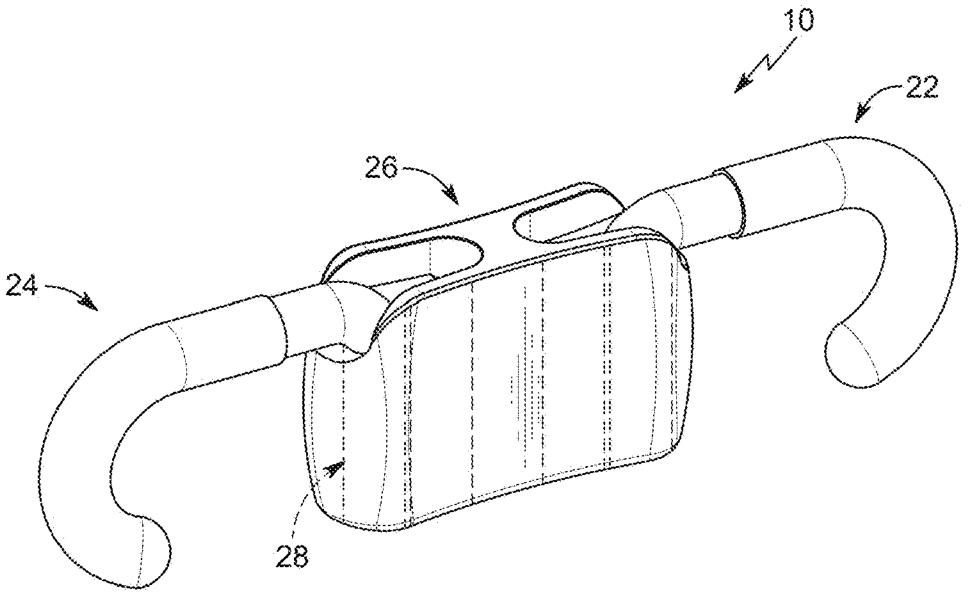
FIG. 1 is a perspective view of one exemplary embodiment of the present disclosure showing a door lock including a lock hub and a pair of knob anchors attached to the lock hub.
Figure 2:
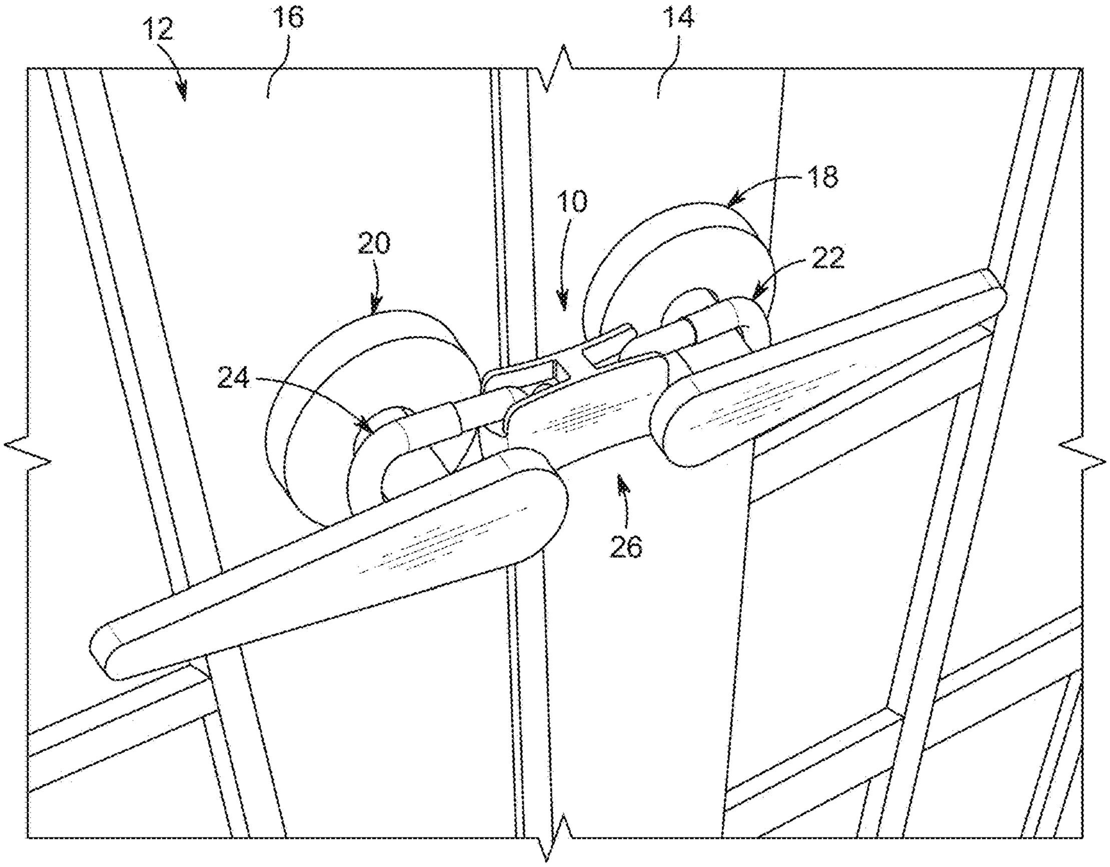
FIG. 2 is a perspective view of the door lock attached to a double door showing the pair of knob anchors gripped on respective door knobs to retain the double door in a closed position.

A door lock 10 in accordance with the present disclosure is configured to secure a double door 12 to block the door 12 from opening as shown in FIGS. 1 and 2. The double door 12 includes a first door panel 14, a second door panel 16, a first door knob or handle 18 coupled to the first door panel 14, and a second door knob or handle 20 coupled to the second door panel 16. The door panels 14, 16 of the double door 12 may be a swinging doors or sliding doors. The door knobs 18, 20 are positioned adjacent to one another when the door panels 14, 16 are in a closed position and separate from one another when the doors panels 14, 16 are in an opened position. The door lock 10 is configured to grip onto the door knobs 18, 20 when the door panels 14, 16 are closed to block the door panels 14, 16 from opening.

The door lock 10 includes a first knob anchor 22, a second knob anchor 24, and a lock hub 26 as shown in FIGS. 1 and 2. The first knob anchor 22 is configured to engage the first door knob 18 when the first door panel 14 is in the closed position. The second knob anchor 24 is configured to engage the second door knob 20 when the second door panel 16 is in the closed position. The lock hub 26 is configured to engage with the first knob anchor 22 and the second knob anchor 24 when the first and second door panels 14, 16 are in the closed position to block separation of the first and second knob anchors 22, 24 so that the first and second door panels 14, 16 are retained in the closed position.

Figure 3:
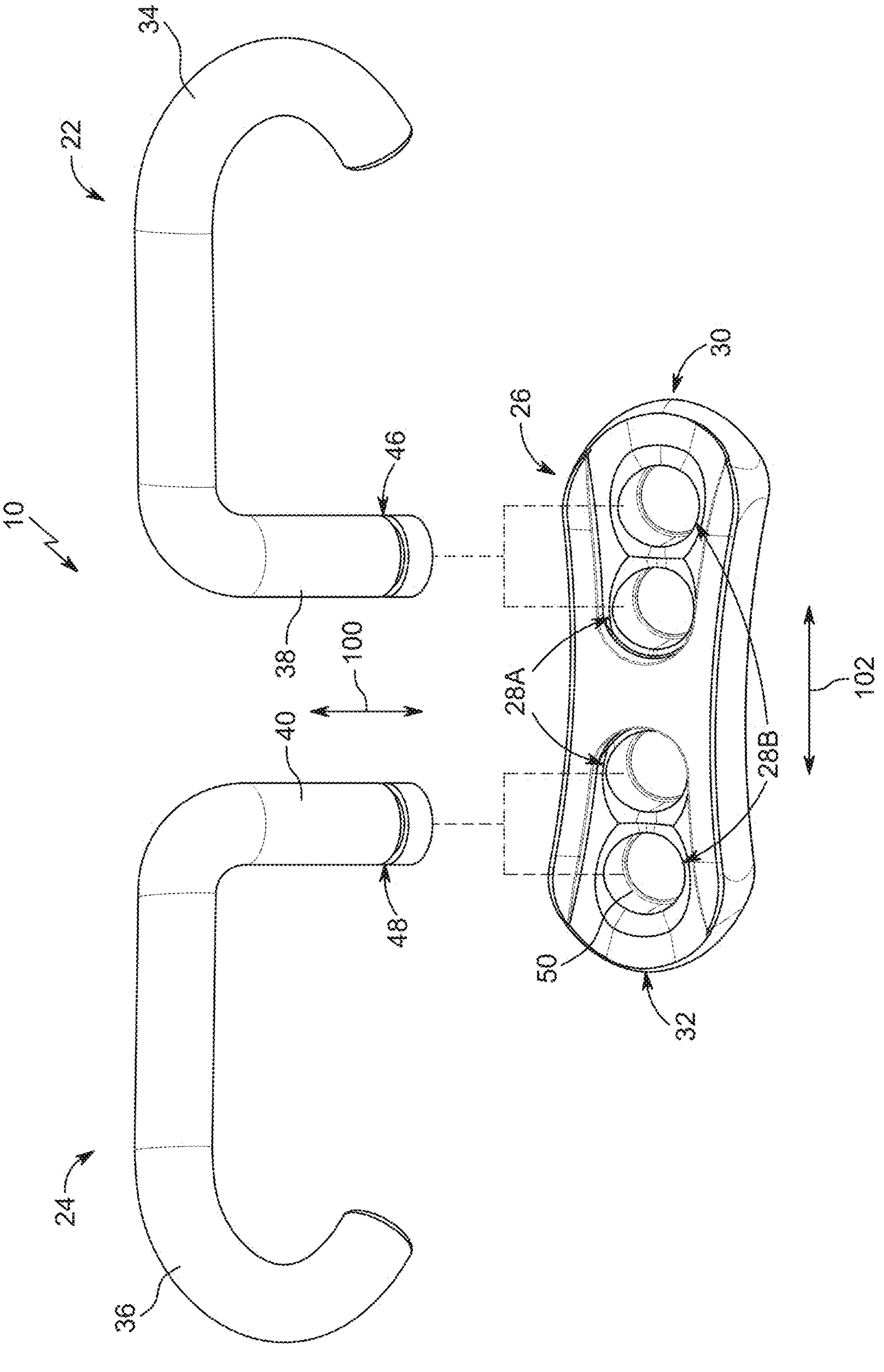
FIG. 3 is an exploded assembly view of the door lock showing that the lock hub is formed to include a plurality of slots and each knob anchor includes an attachment post configured to slide into one of the slots to attach the knob anchors to the lock hub and establish a predetermined distance between the pair of knob anchors corresponding with spacing between each door knob included in the double door.

The lock hub 26 is formed to include a plurality of slots 28 spaced horizontally from one another between a first end 30 of the lock hub 26 and an opposite second end 32 of the lock hub 26 as shown in FIG. 3. A respective portion of the first a second door knob anchors 22, 24 is configured to be inserted in a respective one of the slots 28 in a vertical direction 100 to attach the first and second knob anchors 22, 24 to the lock hub 26. Once inserted in one of the slots 28, the knob anchors 22, 24 become substantially immobilized in a lateral direction 102 perpendicular to the vertical direction. This makes the door lock 10 more robust, durable, and able to withstand greater forces in the lateral direction 102 which corresponds to forces acting on the door lock 10 when the door panels 14, 16 are opened.

The plurality of slots 28 includes an inner pair of slots 28A and an outer pair of slots 28B to allow width adjustment of the first and second knob anchors 22, 24 relative to the lock hub 26 as shown in FIGS. 3-7. The knob anchors 22, 24 can be removed and reinserted into different slots adjust spacing therebetween and accommodate multiple knob spacing distances between the first and second door knobs 18, 20. When the knob anchors 22, 24 are received in the inner pair of slots 28A, the knob anchors 22, 24 are spaced a first distance from one another. When the knob anchors 22, 24 are received in the outer pair of slots 28B, the knob anchors 22, 24 are spaced a second distance from one another greater than the first distance. The knob anchors 22, 24 can also be placed into a combination of slots from the inner and outer pair of slots 28A, 28B to further change the distance between the knob anchors 22, 24. In some embodiments, additional slots can be included in the lock hub and spaced apart from the inner and outer pairs of slots 28A, 28B to provide further adjustment capabilities of the door lock 10.

The spacing between the slots 28A, 28B is pre-established prior to manufacture of the door lock 10 to correspond with typical and/or known distances between door knobs 18, 20. For example, the spacing between the slots 28A, 28B can be selected based on industry manufacturing standards for double doors and/or door knobs. In illustrative embodiments, the first distance is within a range of about 6 inches to about 6.5 inches and the second distance is within a range of about 7 inches to about 7.5 inches. These spacing distances provide the door lock 10 with at least 3 different hook spacing distances each within a total adjustment range of 6.275 inches to 7.275 inches. This allows the door lock 10 to fit on a wide range of door knob pairs, such as door knobs 18, 20, without the door knob anchors 22, 24 being spaced too far from the door knobs where unauthorized removal of the door lock 10 is facilitated.

Figure 4:
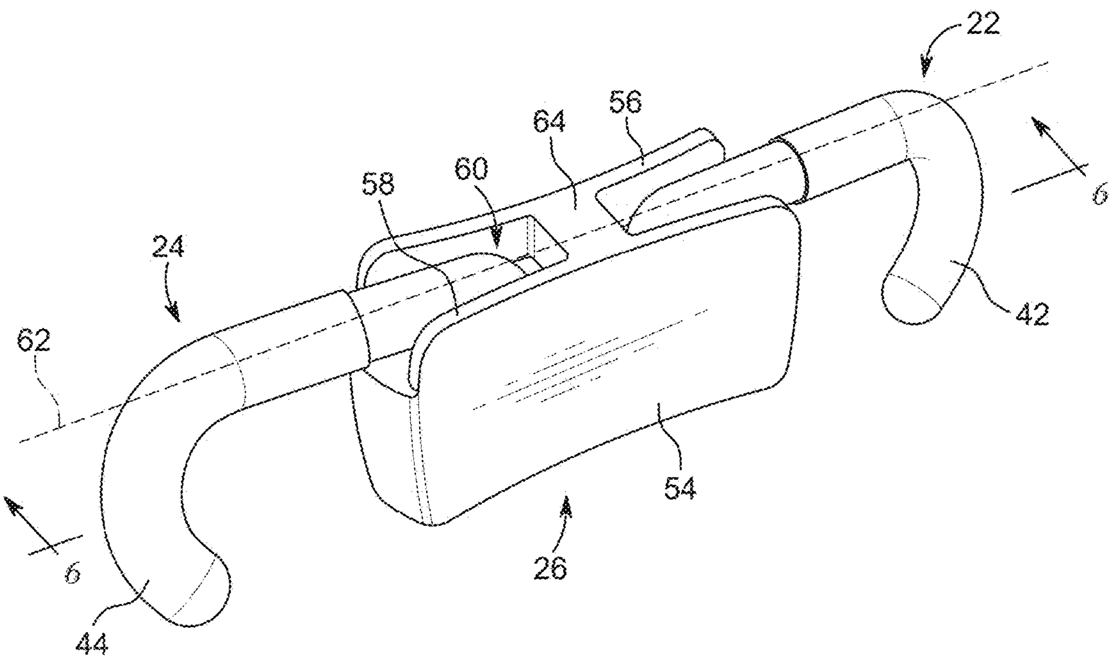
FIG. 4 is a perspective view of the door lock showing the attachment post of each knob anchor received in a pair of inner slots included in the plurality of slots.
Figure 5:
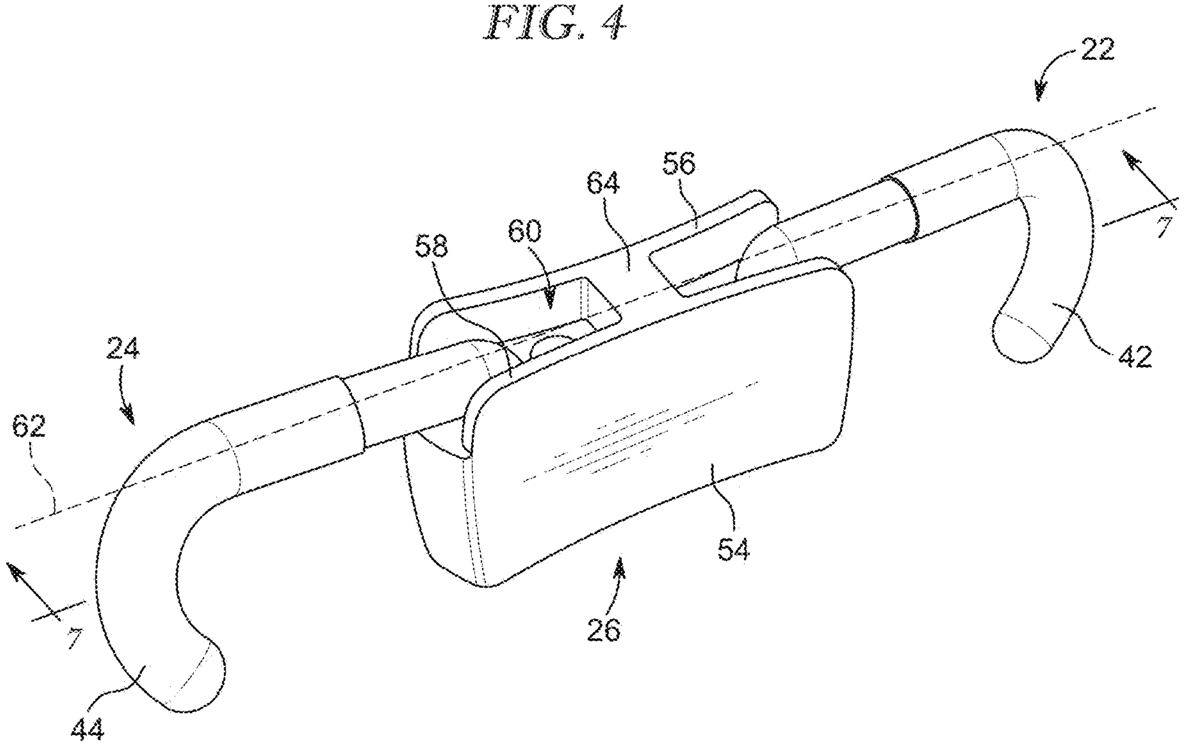
FIG. 5 is a perspective view of the door lock showing the attachment post of each knob anchor received in a pair of outer slots included in the plurality of slots to provide more spacing between the pair of knob anchors.
Figure 6:
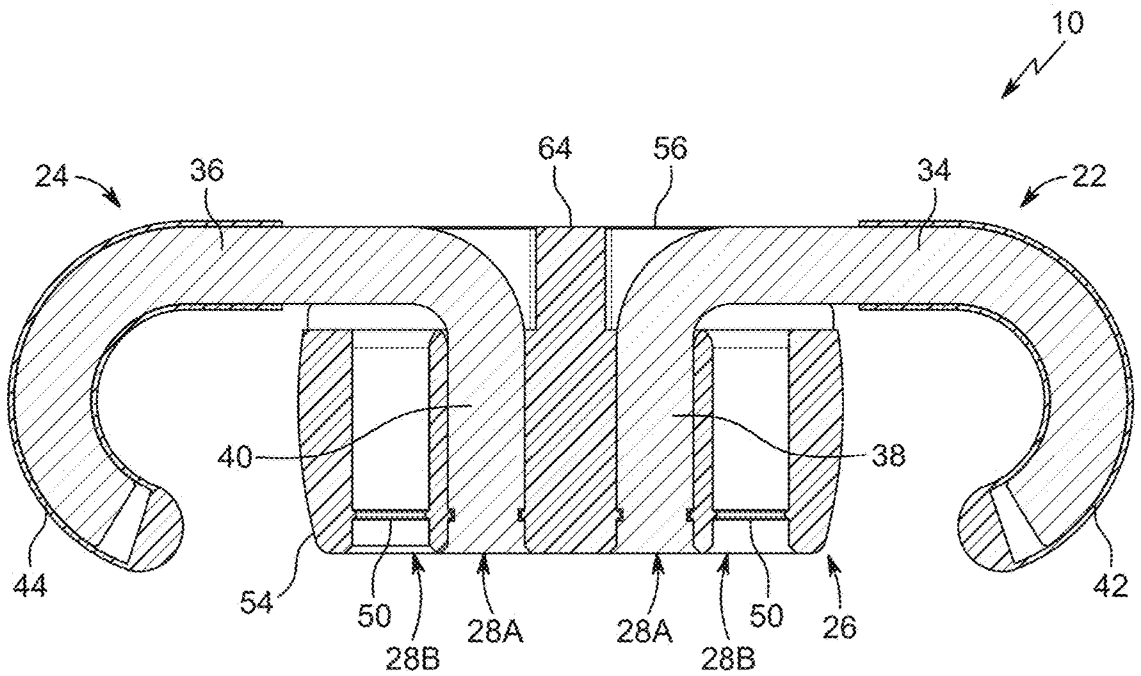
FIG. 6 is a cross section taken along line 6-6- in FIG. 4 showing the attachment post of each knob anchor received in the pair of inner slots included in the plurality of slots.
Figure 7:
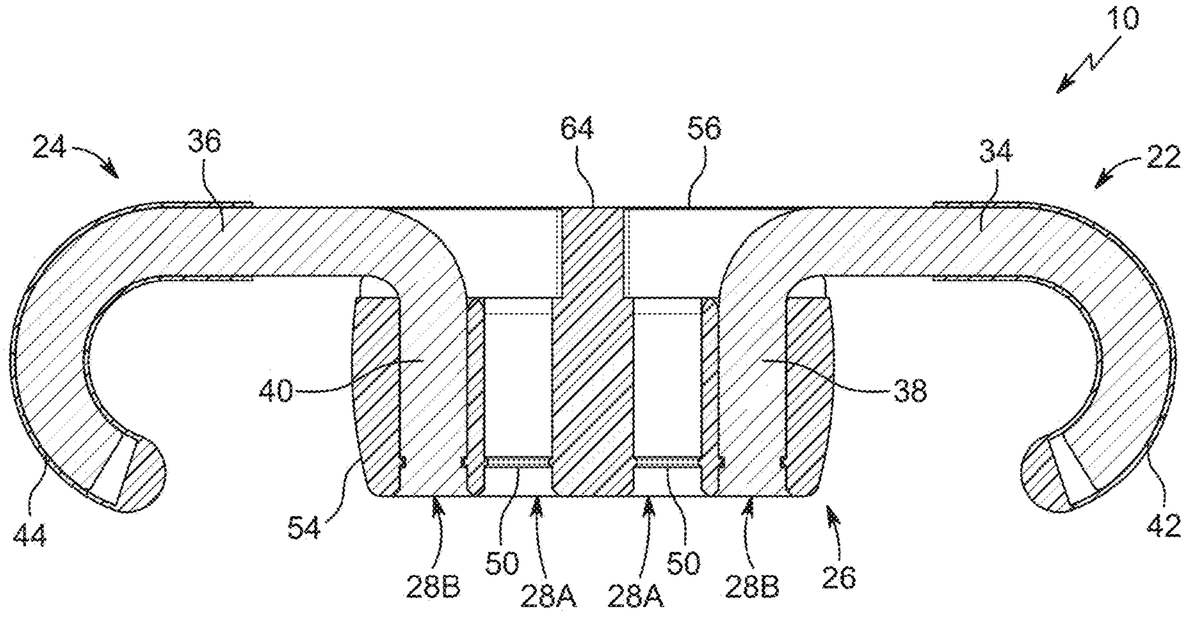
FIG. 7 is a cross section taken along line 7-7- in FIG. 5 showing the attachment post of each knob anchor received in the pair of outer slots included in the plurality of slots.

Each knob anchor 22, 24 includes a hook 34, 36, an attachment post 38, 40, and a cover 42, 44 as shown in FIGS. 3-5. Each respective hook 34, 36 and attachment post 38, 40 is formed integrally with each other and includes metallic materials or another suitable rigid material. Each hook 34, 36 is curved and is configured to extend partway around one of the door knobs 18, 20 when the door lock 10 is secured to the door 12. Each attachment post 38, 40 extends downwardly from an end of each corresponding hook 34, 36 and is configured to extend into one of the slots 28 to attach each knob anchor 22, 24 to the lock hub 26. The covers 42, 44 are made from a rubber or plastic material and are configured to slide onto a respective hook 34, 36 to buffer engagement between each hook 34, 36 and each corresponding door knob 18, 20 so that the door lock does not damage the door 12. The covers 42, 44 also increase friction between the door lock 10 and the door 12 to block separation of the door lock 10 from the door 12.

Each attachment post 38, 40 and each slot 28 may be sized relative to one another to provide an interference fit between each attachment post 38, 40 and the lock hub 26. The interference fit is configured to retain the knob anchors 22, 24 to the lock hub 26. In some embodiments, each attachment post is formed to include a channel 46, 48 and the lock hub includes one or more protrusions 50 that extend into the slots 28 and into a corresponding channel 46, 48 when the knob anchors 22, 24 are installed in the lock hub 26 to block removal of each attachment post 38, 40 from the slots 28. The protrusions 50 can be formed integrally with the lock hub 26 or may be a separate component from the lock hub 26, such as a spring-loaded pin. In the illustrative embodiment, the protrusions 50 are annular rings that extend into each respective slot 28 to slightly decrease a width of the slot at the location of the protrusion 50.

The lock hub 26 is made from a rubber or a rubber-like material. In some embodiments, the lock hub 26 is injection molded to form a monolithic structure consisting of rubber or one or more other polymeric material(s).

The lock hub 26 includes a hub base 54, a first barrier wall 56 coupled to an upper end of the hub base 54, and a second barrier wall coupled to the upper end of the hub base 54. The hub base 54 is formed to include plurality of slots 28 configured to receive the knob anchors 22, 24. The first barrier wall 56 and the second barrier wall 58 extend upwardly away from the hub base 54 and are spaced apart from one another to define a channel 60 therebetween. Each of the slots 28 opens into the channel 60. A height of the barrier walls 56, 58 is at least as great as a thickness of the knob anchors 22, 24.

The first and second knob anchors 22, 24 are arranged to lie at least partially in the channel 60 between the first and second barrier walls 56, 58. The first and second barrier walls 56, 58 are configured to engage the first and second knob anchors 22, 24 to block pivoting of the first and second knob anchors 22, 24 relative to the lock hub 54. This reinforces the door lock 10 when the door lock 10 is installed on the door 12 by maintaining arrangement of the knob anchors 22, 24 and the lock hub 26 along or substantially along a laterally-extending axis 62 extending in the lateral direction 102. In some embodiments, the knob anchors 22, 24 may pivot slightly relative to the lock hub 26 before contacting the first or second barrier walls 56, 58. In one example, the knob anchors 22, 24 are pivotable relative to the lock hub 26 within a range of 5 degrees to 15 degrees from the laterally-extending axis 62.

The lock hub 26 further includes a divider wall 64 extending through the channel to interconnect the first and second barrier walls 56, 58 and separate the first and second knob anchors 22, 24 from one another in the channel 60 as shown in FIGS. 3-7. One slot included in the inner pair of slots 28A and one slot included in the outer pair of slots 28B is located on each side of the divider wall 64.

The door lock 10 can be used with other types of doors, such as a single door 112 (swinging or sliding), and a sliding double door 312 as shown in FIGS. 8-14. The door lock 10 may be included in a door lock kit 120 for use with the single door 112. The door lock kit 120 further includes a door catch 122 configured to mount to a wall or a doorframe 114 bordering a doorway of the door 112. The door catch 122 is separate from the door 112 and is mounted to the wall or doorframe 114 directly adjacent to a door knob 118 included in the door 112 so that the door lock 10 engages the door catch 122 and the door knob 118 in a similar fashion to door knobs 18, 20 previously described.

Figure 8:
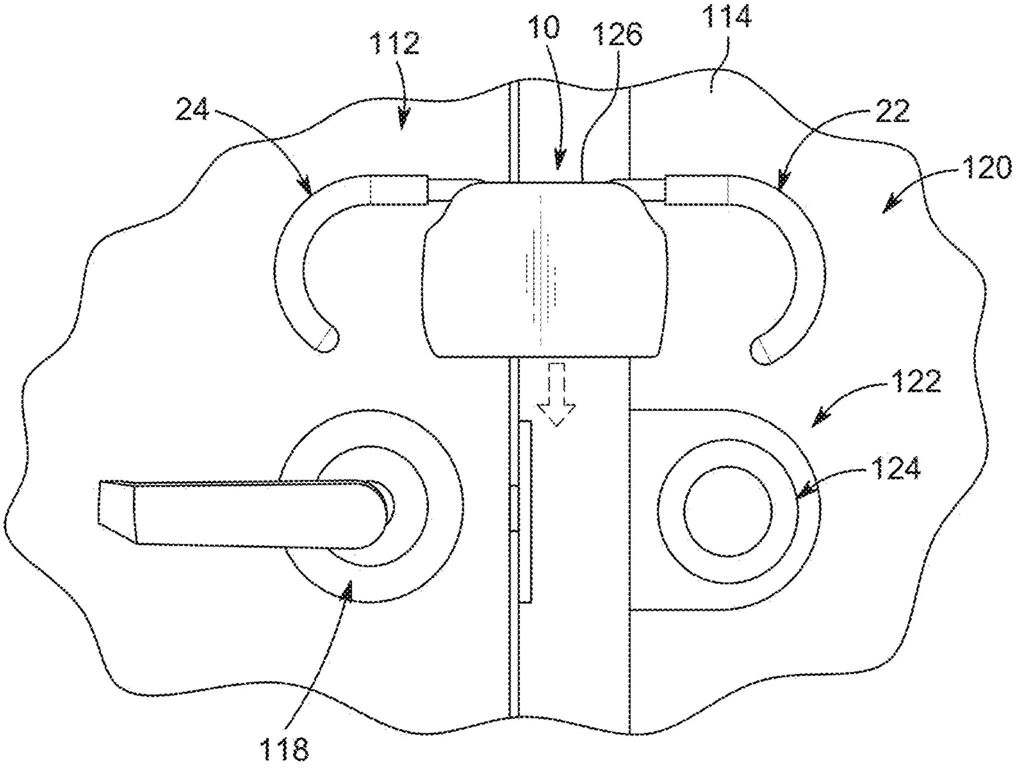
FIG. 8 is a front elevation view of a door lock kit for a single door, the door lock kit including the door lock of FIGS. 1-7 and a door catch configured to be attached to a wall adjacent to a door knob included in the single door when the single door is closed so that the pair of hooks included in the door lock grip the door knob and the door catch to retain the single door in the closed position.
Figure 9:
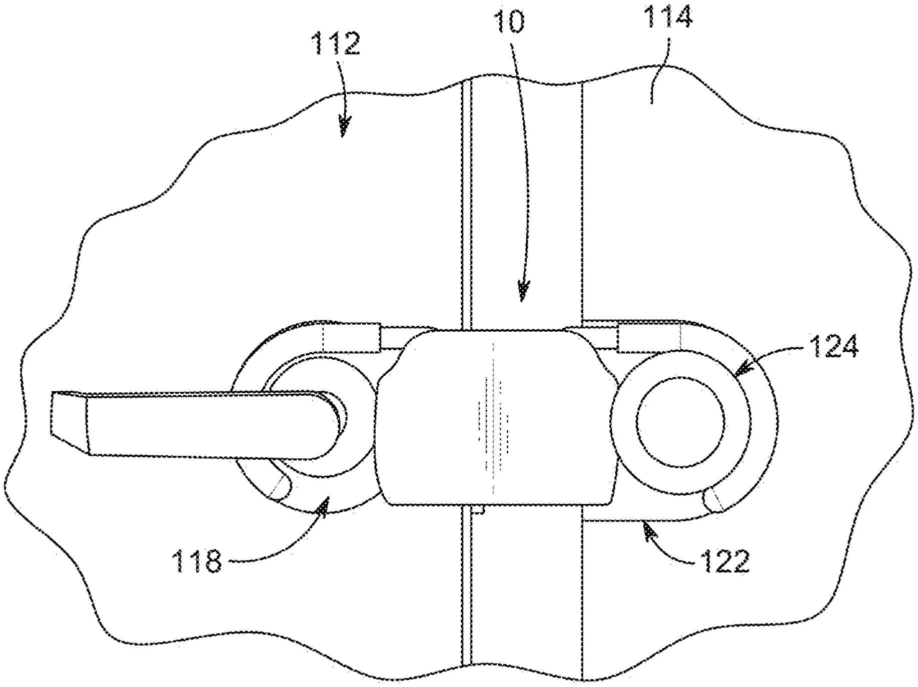
FIG. 9 is a front elevation view of the door lock kit showing the door lock attached to the door knob and the door catch.
Figure 10:
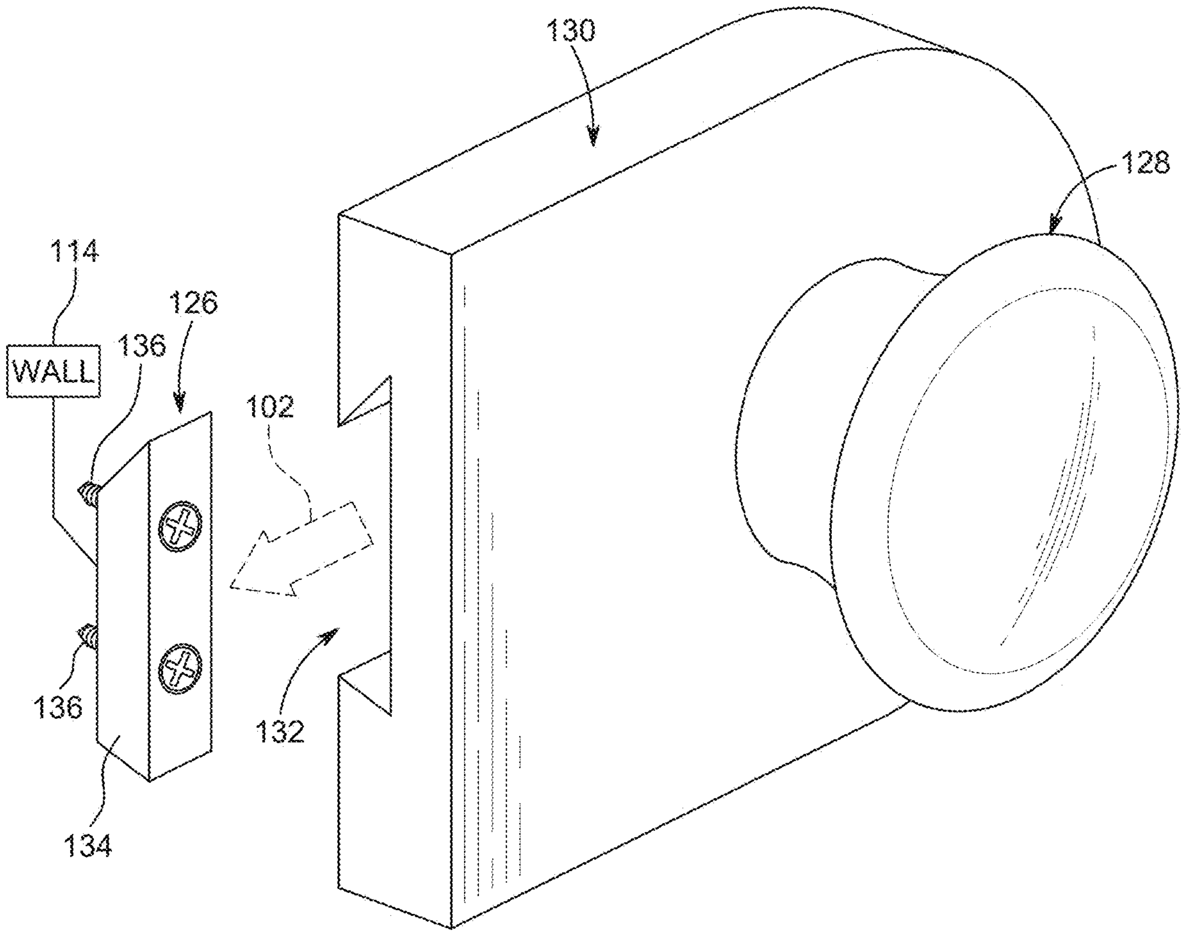
FIG. 10 is a perspective view of the door catch from FIGS. 8 and 9 showing that the door catch includes a second door knob having a knob handle configured to engage with the second knob anchor and a knob base coupled to the knob handle and formed to include mount-receiving passageway, and a door knob mount having a mount base and a mount fastener configured to extend through the mount base and into the wall or doorframe to secure the mount base to the wall or doorframe.

The door catch 122 includes a second door knob 124 and a door knob mount 126 coupled to the second door knob 124 as shown in FIGS. 8-10. The second door knob 124 includes a knob handle 128 configured to engage with the one of the knob anchors 22, 24 and a knob base 130 coupled to the knob handle 128 and formed to include mount-receiving passageway 132. The door knob mount 126 includes a mount base 134 and a mount fastener 136 configured to extend through the mount base 134 and into the wall or doorframe to secure the mount base 134 to the wall or doorframe. The mount base 134 has a cross section that corresponds with the mount-receiving passageway 132 so that the second door knob 124 is slidable onto the mount base 134 in the lateral direction 102 to locate the mount base 134 within the mount-receiving passageway 132 and block movement of the second door knob 124 in an outward direction perpendicular to the lateral direction 102. The knob handle 128 can include any suitable structure to which the knob anchors 22, 24 can mount.

Figure 11:
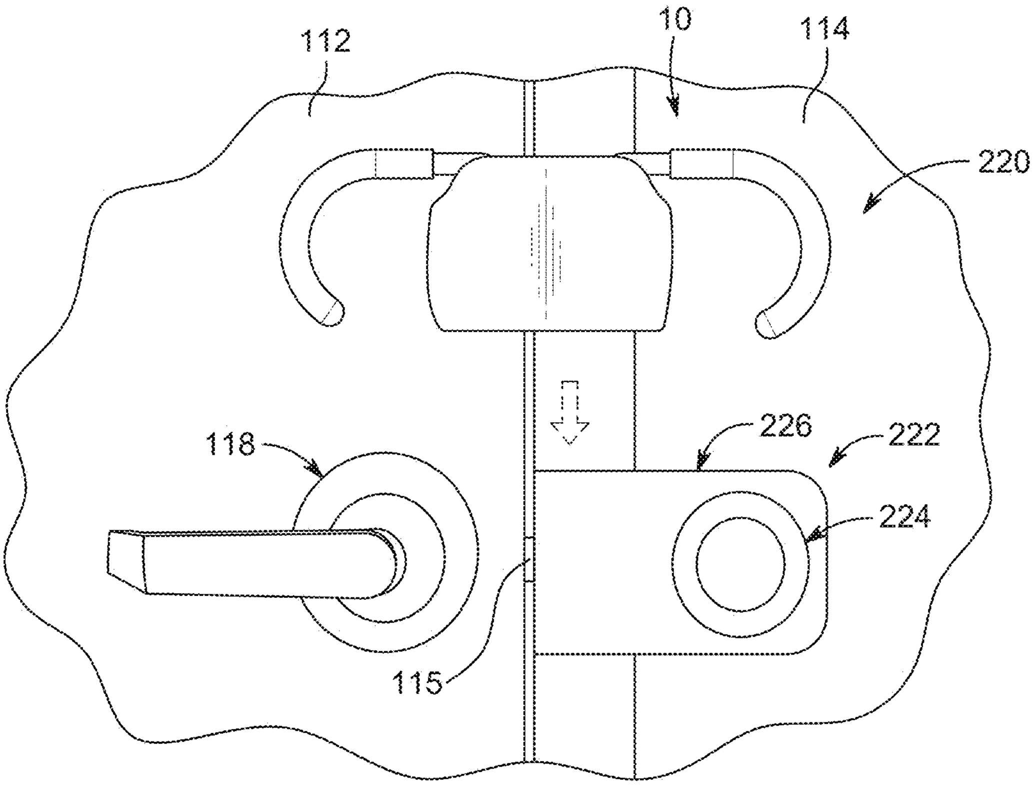
FIG. 11 is a front elevation view of another embodiment of a door lock kit for a single door, the door lock kit including the door lock of FIGS. 1-7 and a door catch configured to be attached to a wall adjacent to a door knob included in the single door when the single door is closed so that the pair of hooks included in the door lock grip the door knob and the door catch to retain the single door in the closed position.
Figure 12:
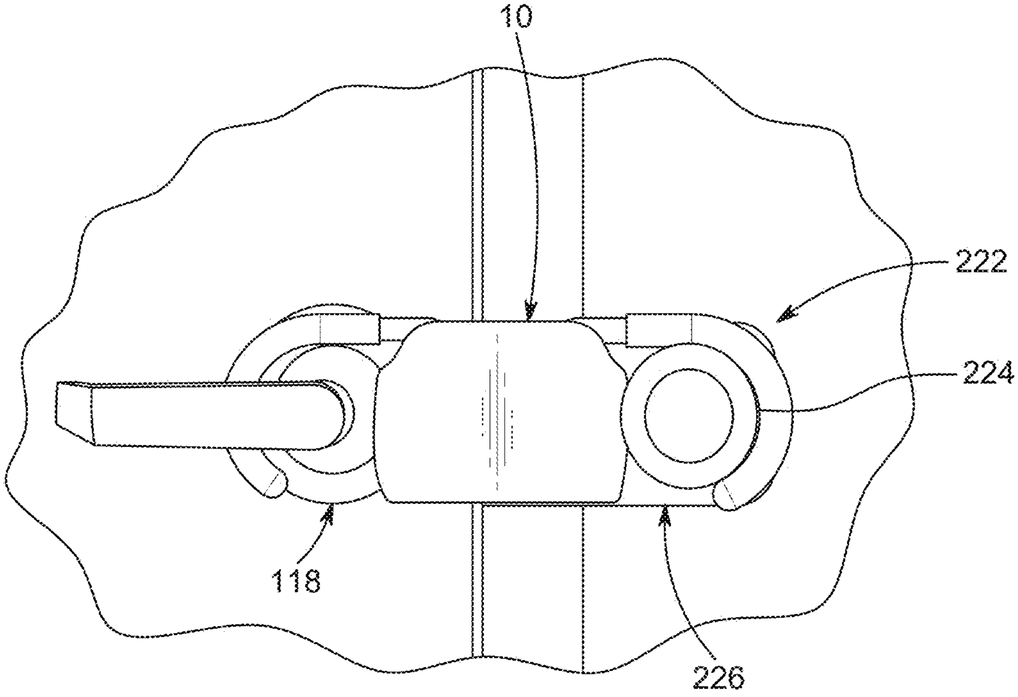
FIG. 12 is a front elevation view of the door lock kit showing the door lock attached to the door knob and the door catch.
Figure 13:
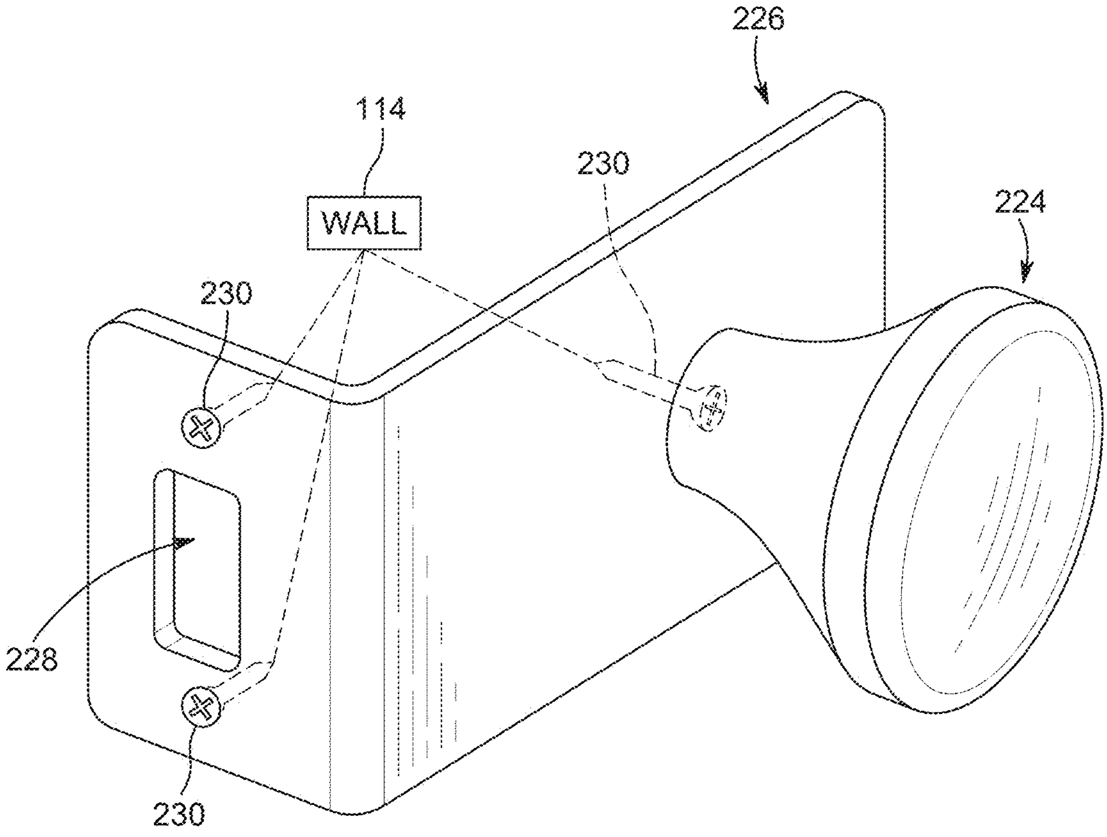
FIG. 13 is a perspective view of the door catch from FIGS. 8 and 9 showing that the door catch includes a second door knob having a knob handle configured to engage with the second knob anchor and a knob base coupled to the knob handle and the wall or doorframe and formed to include latch-receiving passageway configured to receive a door latch included in the door.

Another embodiment of a door lock kit 220 is shown in FIGS. 11-13. The door lock kit 220 includes the door lock 10 and another embodiment of a door catch 222. The door catch 222 is separate from the door 112 and is mounted to the wall or doorframe 114 directly adjacent to the door knob 118 included in the door 112 so that the door lock 10 engages the door catch 222 and the door knob 118 in a similar fashion to door knobs 18, 20 previously described.

The door catch 222 includes a second door knob 224 and a knob base 226. The second door knob 224 is configured to engage with one of the knob anchors 22, 24 of the door lock 10. The knob base 226 is coupled to the second door knob 224 and the wall or doorframe 114 to secure the knob 224 to the wall or doorframe 114. The knob base 226 is formed to include a latch-receiving passageway 228 configured to receive a door latch 115 included in the door 112. A plurality of fasteners 230 is configured to extend through the knob base 226 and into the wall or doorframe 114. In this way, the knob base 226 replaces a conventional latch plate typically used with the door 114 and can make use of prior formed fastener openings (not shown) formed in the wall or doorframe 114 to align the second door knob 224 with the door knob 118 of the door 112 for use with the door lock 10. The second door knob 224 can include any suitable structure to which the knob anchors 22, 24 can mount.

Figure 14:
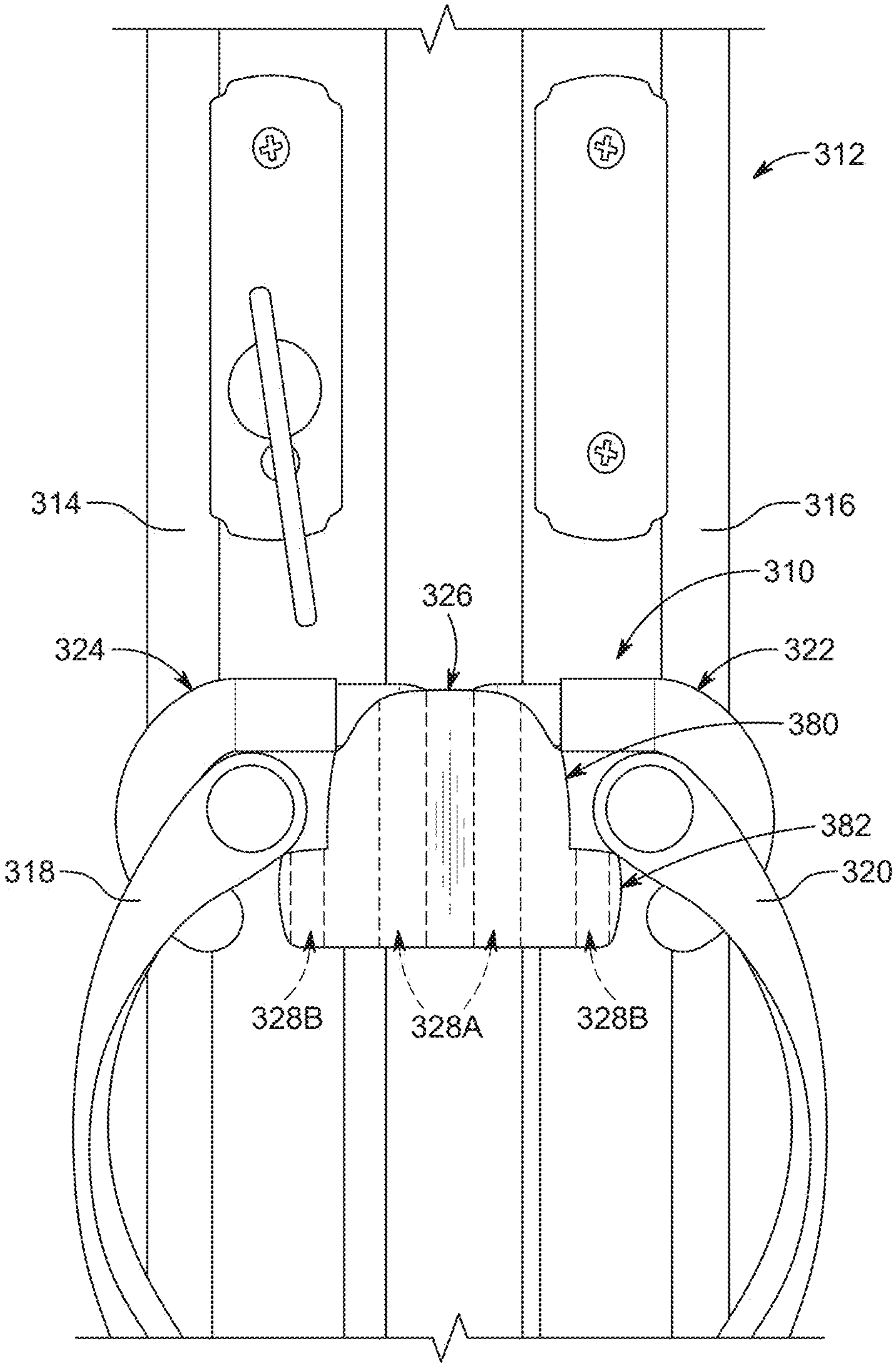
FIG. 14 is a front elevation view of a double door having two door panels that slide toward and away from one another and another embodiment of a door look configured to engage a handle included in each door panel to retain the door panels in a closed position.

Another embodiment of a door lock 310 that can be used to secure the double door 12 or the single door 112 is shown in FIG. 14. The door lock 310 is similar to door lock 10 and includes a first knob anchor 322, a second knob anchor 324, and a lock hub 326. The first and second knob anchors 322, 324 are identical to knob anchors 22, 24. The lock hub 326 is shaped differently than lock hub 26 to allow the door lock 310 to also be used with a double sliding door 312. The double sliding door has a pair of sliding door panels 314, 316 each having a respective door handle 318, 320.

The door handles 318, 320 of the sliding door 312 may be positioned closer to one another compared to other doors. The lock hub 326 is shaped to allow attachment of the door lock 310 with the door handles 318, 320. The lock hub 326 includes an upper hub base section 380 and a slower hub base section 382. The upper hub base section is formed to include only an inner pair of slots 328A. The lower hub base section is formed to include the inner pair of slots 328A and an outer pair of slots 328B.

The upper hub base section 380 has a smaller width in the lateral direction 102 than a width of the lower hub base section 382 as shown in FIG. 14. The smaller width of the upper hub base section 380 allows the lock hub 326 to fit between the door handles 318, 320 while the knob anchors 322, 324 are received in the inner pair of slots 328A. Outer portions of the lower knob base section may reside directly below portions of the door handles 318, 320.

In illustrative embodiments, a method of securing a door way includes positioning the first door 14 and the second door 16 in a closed position in which the first door knob 18 of the first door 14 and the second door knob 20 of the second door 16 are arranged adjacent to one another and the first and second doors 14, 16 close the door way. The method further includes installing the door lock 10 onto the first door knob 18 and the second door knob 18 to block the first door 14 and the second door 16 from moving away from one another. The method further includes inserting an attachment post included in each knob anchor 22, 24 into a respective slot included in the plurality of slots 28 formed in the lock hub 26. The method further includes adjusting a lateral distance between the attachment posts 38, 40 of the first knob anchor 22 and the second knob anchor 24 relative to the lock hub 26 in the lateral direction 102. Inserting the attachment post 38, 40 of the first and second knob anchors 22, 24 into the inner pair of slots 28A spaces the knob anchors 22, 24 a first distance from one another and inserting the attachment post 38, 40 of the first and second knob anchors 22, 24 into the outer pair of slots 28B spaces the knob anchors 22, 24 a second distance from one another less than the first distance.

Unless otherwise indicated, the drawings are intended to be read (for example, cross-hatching, arrangement of parts, proportion, degree, or the like) together with the specification, and are to be considered a portion of the entire written description of this invention. As used in the following description, the terms "horizontal", "vertical", "left", "right", "up" and "down", "upper" and "lower" as well as adjectival and adverbial derivatives thereof (for example, "horizontally", "upwardly", or the like), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The following examples are set forth for purposes of illustration only. Parts and percentages appearing in such examples are by weight unless otherwise stipulated.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

While the methods, equipment and systems have been described in connection with specific embodiments, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

As used in the specification and the appended claims the singular forms "a," "an", and "the" include plural referents unless the context clearly dictates otherwise. "Optional" or "optionally" means that the subsequently described event or circumstance may or may not occur, and that the description includes instances where said event or circumstance occurs and instances where it does not.

Disclosed are components that can be used to perform the disclosed methods, equipment and systems. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all methods, equipment and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

What is claimed is:

1. A door lock for a double door having a first door panel, a second door panel, a first door knob or handle coupled to the first door panel, and a second door knob or handle coupled to the second door panel, the first and second door knobs spaced a first distance apart from one another when the door panels are in a closed position and spaced a second distance apart from one another when the door panels are in an opened position, the second distance being greater than the first distance, the door lock comprising:

a first knob anchor configured to engage the first door knob when the first door panel is in the closed position, a second knob anchor configured to engage the second door knob when the second door panel is in the closed position, and a lock hub configured to engage with the first knob anchor and the second knob anchor when the first and second door panels are in the closed position to block separation of the first and second knob anchors so that the first and second door panels are retained in the closed position, wherein the lock hub is formed to include a plurality of slots spaced horizontally from one another between a first end of the lock hub and an opposite second end of the lock hub, and a respective portion of the first and second door knob anchors is configured to be inserted in a respective one of the slots in a vertical direction to attach the first and second knob anchors to the lock hub, wherein the lock hub includes a hub base formed to include a first post-receiving slot configured to receive the first knob anchor and a second post-receiving slot configured to receive the second knob anchor, a first barrier wall coupled to an upper end of the hub base and extending upwardly away from the hub base, and a second barrier wall coupled to the upper end of the hub base and extending upwardly from the hub base, and wherein the first and second barrier walls are spaced apart from one another to define a channel therebetween, and the first and second knob anchors are arranged to lie between the first and second barrier walls and at least partially in the channel.

2. The door lock of claim 1, wherein the plurality of slots includes an outer pair of slots and an inner pair of slots to allow width adjustment of the first and second knob anchors to accommodate multiple knob spacing distances between the first and second door knobs.

3. The door lock of claim 2, wherein the outer pair of slots includes a first slot and a second slot spaced a first distance from one another and the inner pair of slots includes a third slot and a fourth slot spaced a second distance from one another, the second distance is within a range of about 6 inches to about 6.5 inches and the first distance is within a range of about 7 inches to about 7.5 inches.

4. The door lock of claim 1, wherein each knob anchor includes a metallic hook and a rubber cover.

5. The door lock of claim 4, wherein each knob anchor further includes an attachment post configured to slide into a respective slot formed in the lock hub, and wherein the attachment post and each slot are sized to provide an interference fit between each attachment post and the lock hub.

6. The door lock of claim 1, wherein the lock hub includes rubber or a rubber-like material.

7. The door lock of claim 1, wherein the lock hub further includes a divider wall extending through the channel to interconnect the first and second barrier walls and separate the first and second knob anchors from one another in the channel.

8. The door lock of claim 7, wherein the hub base is formed to include a third post-receiving slot arranged to lie on a first side of the divider wall with the first post-receiving slot and a fourth post-receiving slot arranged to lie on an opposite second side of the divider wall with the second post-receiving slot.

9. A door lock comprising:

a first knob anchor, a second knob anchor, and a lock hub configured to engage with the first knob anchor and the second knob anchor, wherein the lock hub is formed to include a plurality of slots spaced horizontally from one another between a first end of the lock hub and an opposite second end of the lock hub, and a respective portion of the first and second door knob anchors is configured to be inserted in a respective one of the slots in a vertical direction to attach the first and second knob anchors to the lock hub, wherein the lock hub includes a hub base formed to include a first post-receiving slot configured to receive the first knob anchor and a second post-receiving slot configured to receive the second knob anchor, a first barrier wall coupled to an upper end of the hub base and extending upwardly away from the hub base, and a second barrier wall coupled to the upper end of the hub base and extending upwardly from the hub base, and wherein the first and second barrier walls are spaced apart from one another to define a channel therebetween, and the first and second knob anchors are arranged to lie between the first and second barrier walls and at least partially in the channel.

10. The door lock of claim 9, wherein the lock hub is formed to include a plurality of slots and the plurality of slots includes an outer pair of slots and an inner pair of slots to allow width adjustment of the first and second knob anchors.

11. The door lock of claim 10, wherein the outer pair of slots includes a first slot and a second slot spaced a first distance from one another and the inner pair of slots includes a third slot and a fourth slot spaced a second distance from one another, the second distance is within a range of about 6 inches to about 6.5 inches and the first distance is within a range of about 7 inches to about 7.5 inches.

12. The door lock of claim 9, wherein each knob anchor includes a metallic hook, a rubber cover covering the metallic hook, and an attachment post configured to slide into a respective slot formed in the lock hub, and wherein the attachment post and each slot are sized to provide an interference fit between each attachment post and the lock hub.

13. The door lock of claim 9, wherein the hub base is formed to include a third post-receiving slot and a fourth post-receiving slot.

* * * * *